(12) United States Patent
Schwagmann et al.

(10) Patent No.: US 7,769,403 B2
(45) Date of Patent: Aug. 3, 2010

(54) APPARATUS AND METHOD FOR REQUESTING OR ALLOCATING A PUSH-TO-TALK RIGHT TO TALK AND/OR FOR REQUESTING OR COMMUNICATING QUEUING INFORMATION

(75) Inventors: Norbert Schwagmann, Lehe (DE); Andreas Schmidt, Braunschweig (DE); Holger Schmidt, Braunschweig (DE)

(73) Assignee: Infineon Technologies AG, Neubiberg (DE)

( * ) Notice: Subject to any disclaimer, the term of this patent is extended or adjusted under 35 U.S.C. 154(b) by 1108 days.

(21) Appl. No.: 11/252,361

(22) Filed: Oct. 13, 2005

(65) Prior Publication Data

US 2006/0084455 A1    Apr. 20, 2006

(30) Foreign Application Priority Data

Oct. 13, 2004    (DE) .................. 10 2004 049 907

(51) Int. Cl.
*H04B 7/00* (2006.01)
*H04Q 7/20* (2006.01)
(52) U.S. Cl. .................. 455/518; 455/517; 455/515; 455/510
(58) Field of Classification Search .................. 455/517, 455/518, 519, 520, 515, 412.1, 414.1, 415, 455/416, 456.1, 510, 512, 414.3, 509, 452.1, 455/68
See application file for complete search history.

(56) References Cited

U.S. PATENT DOCUMENTS

| 7,398,079 B2* | 7/2008 | Munje ................ 455/412.1 |
| 7,433,680 B2* | 10/2008 | Jenkins et al. ........... 455/412.1 |
| 2003/0078064 A1 | 4/2003 | Chan |
| 2005/0164681 A1* | 7/2005 | Jenkins et al. ........... 455/412.1 |
| 2005/0190740 A1* | 9/2005 | Zhao et al. .................. 370/349 |
| 2006/0030347 A1* | 2/2006 | Biswaas ..................... 455/518 |

FOREIGN PATENT DOCUMENTS

| CN | 1323502 A | 11/2001 |
| GB | 2 271 690 A | * 4/1994 |
| WO | WO-00/11879 A1 | 3/2000 |

OTHER PUBLICATIONS

OMA Document: Technical Specification Group Services and System Aspects TSGS #22(03)0562: Push to talk over Cellular Requirements, Draft Version, 1.0—Oct. 15, 2003, pp. 1-21 and 43-58.

(Continued)

*Primary Examiner*—John Lee
(74) *Attorney, Agent, or Firm*—Dickstein, Shapiro, LLP.

(57) ABSTRACT

A push-to-talk communication system is described in which a decision unit (chair) and/or a queue are provided for allocating the right to talk during a push-to-talk communication, and corresponding control messages, request messages and information messages are transmitted.

14 Claims, 4 Drawing Sheets

OTHER PUBLICATIONS

G. Camarillo, et al.: "The Binary Floor Control Protocol (BFCP)"; Aug. 2004; in http://tools.ietf.org/html/draft-ietf-xcon-bfcp-01.txt.

E. O'Regan et al.; "Performance Estimation of a SIP based Push-to-Talk Service for 3G Networks"; In Fifth European Wireless Conference (EW2004), Barcelona, Spain, Feb. 2004, http://research.ac.upc.edu/EW2004/papers/144.pdf.

"The Binary Floor Control Protocol (BFCP) draft-ietf-xcon-bfcp-06.txt"; http://ietfreport.isoc.org/ids/draft-ietf-xcon-bfcp-06.txt, Dec. 7, 2005.

3GPP TR 23.979 V1.1.0 (Aug. 2004); Technical Report; 3rd Generation Partnership Project; Technical Specification Group Services and System Aspects; 3GPP enablers for OMA PoC Services; Stage 2 (Release 6).

Push-to-Talk over Cellular (PoC) User Plane; Transport Protocols; PoC Release 1.0—(http://www.siemens-mobile.com/repository/38/3888/Push_to_talk_over_Cellular_PoC.zip), Aug. 2003.

RFC3550 "RTP: A Transport Protocol for Real-Time Applications", ftp://ftp.rfc-editor.org/in-notes/std/std64.txt, Jul. 2003.

* cited by examiner

APPARATUS AND METHOD FOR REQUESTING OR ALLOCATING A PUSH-TO-TALK RIGHT TO TALK AND/OR FOR REQUESTING OR COMMUNICATING QUEUING INFORMATION

CROSS-REFERENCE TO RELATED APPLICATION

This application claims priority to German Patent Application Serial No. 10 2004 049 907.1-55, which was filed on Oct. 13, 2004 and is incorporated herein by reference in its entirety.

FIELD OF THE INVENTION

The invention relates to a method for requesting a push-to-talk right to talk and/or for requesting queuing information, a method for allocating a push-to-talk right to talk and/or for communicating queuing information, a push-to-talk client unit, a controlling push-to-talk server and a decision unit.

BACKGROUND OF THE INVENTION

The push-to-talk over cellular (PoC) communication service enables a user of a mobile radio subscriber unit to convey voice data simultaneously to one or more receivers.

For this purpose, a special PoC key is typically provided on the mobile radio subscriber unit, after the operation of which the user can begin speaking voice data.

The voice data are usually already distributed, that is to say conveyed to the desired receiver or receivers, by means of a mobile radio communication network while speaking. This process is called "streaming".

The conveying is done in half-duplex method, that is to say during the speaking and during the transmission, only the sender, that is to say the user who speaks and sends the voice data, can transmit voice data to the receivers but the receivers cannot, at the same time, send voice data to the sender. In particular, the sender cannot be interrupted by the receivers.

From the point of view of the user, a communication by means of PoC clearly corresponds to the conventional CB radio, but with the extension that the transmitter can convey voice data throughout the world to receivers who can be reached by means of the appropriate switching technology of at least one mobile radio communication network.

If a user of PoC wishes to send voice messages to the same receiver more frequently, PoC will enable him to define personal fixed user groups. For example a user of PoC can define a group with the designation "friends" which has corresponding members and their respective address, for example an SIP URL (Session Initiation Protocol Uniform Resource Locator) in the form of a telephone number or in the form of an SIP address.

For this group, a separate group address in the form of an SIP URL can then be assigned and when a PoC communication is set up, that is to say a communication session by means of PoC, specifying the group address which is initiated by a user, all members of the group are addressed by a PoC server and invited to join the PoC communication.

The prerequisite for a member of the group being invited is that the member is registered in the mobile radio communication network by means of which the PoC used is provided, i.e. is on-line.

Users of PoC who are actively involved in a PoC communication, that is to say as transmitter or passively, that is to say as receiver, will be called PoC participant in the PoC communication in the text which follows.

At present, standardization work for standardizing the PoC communication service is being carried out as part of the PS (packet-switched) domain of UMTS (Universal Mobile Telecommunications System) communication systems and/or as part of the PS domain GPRS (General Packet Radio Service) of GSM (Global System for Mobile Communication) communication systems. This standardization work is taking place within the framework of the standardization organizations OMA (Open Mobile Alliance) and 3GPP (3rd Generation Partnership Project). The protocols used in this standardization work are partially defined in the standardization organizations of the IETF (Internet Engineering Task Force).

It is provided that PoC is implemented, among other things, also on the basis of IMS (Internet Protocol based Multimedia Subsystem) communication systems in which the SIP (Session Initiation Protocol) signaling protocol and its extensions are used.

As mentioned above, in PoC voice data are transmitted in half-duplex and as an illustration, only one PoC participant is allowed to speak at any time of a PoC communication, and all other PoC participants can only receive, that is to say cannot send out any voice data. Within a PoC communication, therefore, only one PoC participant has a right to talk at any time, that is to say the right of sending out voice data to other PoC participants during the PoC communication. During a PoC communication, the right to talk is typically issued successively to different PoC participants. The administration and issuing of the right to talk is called floor control or talk burst control and is performed by a controlling PoC server which is called PoC server controlling function, or via a talk burst control server.

During a PoC communication, floor control is performed in accordance with the basic principle that the PoC client unit used by a PoC participant requests the right to talk from the controlling PoC server and the controlling PoC server thereupon refuses or grants the right to talk to the PoC client unit and correspondingly signals this to the PoC client unit. A PoC client unit is refused the right to talk, for example if another PoC client unit has the right to talk at the time at which the PoC client unit requests the right to talk.

Table 1 contains a list of the messages, defined in accordance with the prior art for the talk burst control during a PoC communication.

TABLE 1

| Direction of transmission of the message | Message name | Description of the message |
|---|---|---|
| Client → Server | Talk burst request | A PoC client unit asks the controlling PoC server whether it can receive the right to talk |
| Server → Client | Talk burst confirm response | The controlling PoC server confirms the right to talk to the inquiring PoC client unit |
| Server → Client | Talk burst reject response | The controlling PoC server denies the inquiring PoC client unit the right to talk |
| Server → Client | Receiving talk burst indication | The controlling PoC server informs all PoC client units (except the PoC client unit |

TABLE 1-continued

| Direction of transmission of the message | Message name | Description of the message |
|---|---|---|
| | | with the right to talk) that the right to talk has been issued and thus voice messages are now also sent out |
| Client → Server | Talk burst completed indication | A PoC client unit with the right to talk informs the controlling PoC server that it gives up the right to talk |
| Server → Client | No talk burst indication | The controlling PoC server informs all PoC client units that currently nobody has the right to talk and thus also no voice messages are sent out |
| Server → Client | Stop talk burst indication | The controlling PoC server withdraws the right to talk from a PoC client unit with the right to talk |

The messages contained in Table 1 are implemented as RTCP APP packets, that is to say by means of the packet type for application-specific functions (APP) of the real-time control protocol (RTCP). The specifications of the respective RTCP APP packets are described in Push-to-Talk over Cellular (PoC) User Plane; Transport Protocols; PoC Release 1.0.

The binary floor control protocol (BFCP) is described in The Binary Floor Control Protocol (BFCP)—ftp://ftp.rfc-editor.org/in-notes/internet-drafts/draft-ietf-xcon-bfcp-01.txt.

The specification of RTCP is described in RFC3550 "RTP: A Transport Protocol for Real-Time Applications", Network Working Group, July 2003.

SUMMARY OF THE INVENTION

An apparatus and method for requesting a push-to-talk right to talk during a push-to-talk communication and/or for requesting queuing information about a queue which has entries which in each case correspond to a request for the push-to-talk right to talk during the push-to-talk communication and which queue is taken into consideration during allocation of the push-to-talk right to talk. The push-to-talk client unit generates a real-time control protocol message which contains queue administration information for administering the queue and/or contains information that the push-to-talk client unit is requesting queuing information, and the push-to-talk client unit sends the real-time control protocol message to a controlling push-to-talk server.

BRIEF DESCRIPTION OF THE DRAWINGS

Exemplary embodiments of the invention are shown in the figures and will be explained in greater detail in the text which follows.

DETAILED DESCRIPTION OF PREFERRED EMBODIMENTS OF THE INVENTION

The invention is based on the problem of efficiently providing an extended functionality with regard to the allocation of the right to talk in push-to-talk communication systems.

The problem is solved by a method for requesting a push-to-talk right to talk and/or for requesting queuing information, a method for allocating a push-to-talk right to talk and/or for communicating queuing information, a push-to-talk client unit, a controlling push-to-talk server and a decision unit.

A method is provided for requesting a push-to-talk right to talk during a push-to-talk communication and/or for requesting queuing information about a queue which has entries which in each case correspond to a request for the push-to-talk right to talk during the push-to-talk communication and which queue is taken into consideration during the allocation of the push-to-talk right to talk, a push-to-talk client unit generating a real-time control protocol message which contains queue administration information for administering the queue and/or contains information that the push-to-talk client unit is requesting queuing information and the push-to-talk client unit sends the real-time control protocol message to a controlling push-to-talk server.

Furthermore, a method is provided for allocating a push-to-talk right to talk during a push-to-talk communication and/or for communicating queuing information about a queue which has entries which in each case correspond to a request for the push-to-talk right to talk during a push-to-talk communication and which queue is taken into consideration during the allocation of the push-to-talk right to talk, a controlling push-to-talk server generating a real-time control protocol message which contains queue administration information for administering the queue and/or contains information that the controlling push-to-talk server is requesting queuing information and/or contains the information that the controlling push-to-talk server is requesting control information which specifies how the push-to-talk right to talk is to be allocated and the controlling push-to-talk server sends the real-time control protocol message to a decision unit.

Furthermore, a push-to-talk client unit, a controlling push-to-talk server and a decision unit are provided according to the method described above for requesting a push-to-talk right to talk and/or for requesting queuing information and the method described above for allocating a push-to-talk right to talk and/or for communicating queuing information.

In particular, push-to-talk means Push-to-Talk over Cellular (PoC).

In the text which follows, the decision unit is also called Chair. It can be a separately configured server or also implemented by means of the push-to-talk client unit of a privileged user, which privileged user is thus clearly the moderator of the push-to-talk communication. Similarly, the decision unit can be implemented by means of a push-to-talk client unit of a user who is not participating in the push-to-talk communication.

To illustrate, all push-to-talk client units making a push-to-talk right to talk request are queued in the queue. If a push-to-talk client unit makes a push-to-talk request for the right to talk, it is inserted, for example at the end of the queue, that is to say an entry corresponding to the push-to-talk client unit is generated at the end of the queue. If the push-to-talk right to talk is not issued or is given up, it is issued to the push-to-talk client unit which corresponds to the first entry in the queue (this entry is deleted and all other entries move up). To illustrate, the push-to-talk client units in this example are served in accordance with a FIFO principle (first in, first out), other alternatives are possible, particularly taking into consideration a priority of the push-to-talk client unit when it is inserted into the queue.

An idea on which the invention is based can be seen in the fact that an extension of the functionality of push-to-talk communication systems with regard to the allocation of the right to talk, which functionality is achieved by providing a decision unit and/or a queue, is implemented during a push-to-talk communication by means of the real-time control protocol (RTCP), that is to say by means of real-time control protocol packets (preferably of the packet type for application-specific functions (APP) of the real-time control protocol).

Push-to-talk signaling data are usually transmitted via the IMS, i.e. the corresponding messages may be forwarded over very many proxies which can lead to delays in the signaling. Voice data on the other hand, are transmitted in push-to-talk by means of real-time protocol packets which do not travel via the IMS but directly from the transmitter, i.e. a PoC client unit, to the receiver, e.g. a controlling PoC server. Since real-time control protocol packets can be transmitted in parallel with real-time protocol packets on the same transmission path, a comparatively very rapid signaling can be achieved in this manner which is needed for allocating a push-to-talk right to talk.

A further advantage, particularly compared with the use of other protocols such as e.g. the binary floor control protocol (BFCP) consists in that the messages listed in Table 1 which, as explained provide for a fundamental functionality, are implemented by using real-time control protocol packets according to the prior art. Thus, push-to-talk client units and controlling push-to-talk servers of conventional push-to-talk communication systems already support the use of the real-time control protocol which is why the implementation of the extended functionality only results in little implementation expenditure.

The further embodiments of the invention which are described in connection with the method for requesting a push-to-talk right to talk and/or for requesting queuing information and the method for allocating a push-to-talk right to talk and/or for communicating queuing information correspondingly also apply to the push-to-talk client unit, the controlling push-to-talk server and the decision unit.

In the case of the method for requesting a push-to-talk right to talk during a push-to-talk communication and/or for requesting queuing information about a queue, it is preferred that the queue administration information specifies a priority of the push-to-talk client unit and/or specifies that the push-to-talk client unit takes back a request of the push-to-talk client unit for the push-to-talk right to talk.

The use of priorities enables certain push-to-talk client units (those with a relatively high priority) to receive the (push-to-talk) right to talk with preference before others (those with relatively low priority). If a first push-to-talk client unit has a higher priority than a second push-to-talk client unit, the first push-to-talk client unit, for example, is always inserted into the queue before the second push-to-talk client unit, even if it has requested the right to talk later or the first push-to-talk client unit, for example, can interrupt the second push-to-talk client unit, i.e. when the second push-to-talk unit currently has the right to talk and the first push-to-talk client unit requests the right to talk, the right to talk is withdrawn from the second push-to-talk client unit and allocated to the first push-to-talk client unit.

It is also preferred that the queue is administered by the controlling push-to-talk server and/or by a decision unit.

The use of a queue has the advantage, for example, that a push-to-talk client unit only needs to request the right to talk once even if the right to talk is not immediately granted to it. Furthermore, this provides for a clearly more just allocation of the right to talk.

Furthermore, it is preferred that the requested queuing information is the information about the position of the entry, which corresponds to a push-to-talk request for the right to talk by the push-to-talk client unit, and/or the information of the complete queue.

In this manner, the user of a push-to-talk client unit with a view of the queue can inform himself, when he and other users will possibly be granted the right to talk. For example a user can recognize that, before the entry corresponding to his push-to-talk client unit, there is an entry in the queue which corresponds to the push-to-talk client unit of another user and to which other user thus the right to talk will be granted before the user.

It is also preferred that the controlling push-to-talk server allocates the push-to-talk right to talk by taking into consideration the queue and/or generates a real-time control protocol response message with the requested queuing information and conveys it to the push-to-talk client unit.

In the case of the method for allocating a push-to-talk right to talk during a push-to-talk communication and/or for communication queuing information about a queue, it is preferred that the queue administration information contains an identification of a push-to-talk client unit and specifies a priority of the push-to-talk client unit and/or specifies that the push-to-talk client unit takes back a request of the push-to-talk client unit for the push-to-talk right to talk.

The queue is preferably administered by the decision unit.

It is also preferred that the requested queuing information is the information about the position of the entry which corresponds to a push-to-talk right to talk request of a push-to-talk client unit and/or an information item about the total state of the queue.

It is also preferred that the decision unit generates a first real-time control protocol response message with the requested control information and conveys it to the controlling push-to-talk server and/or generates a second real-time control protocol response message with the requested queuing information and conveys it to the controlling push-to-talk server and/or administers the queue, taking into consideration the queue administration information.

Figure 1:
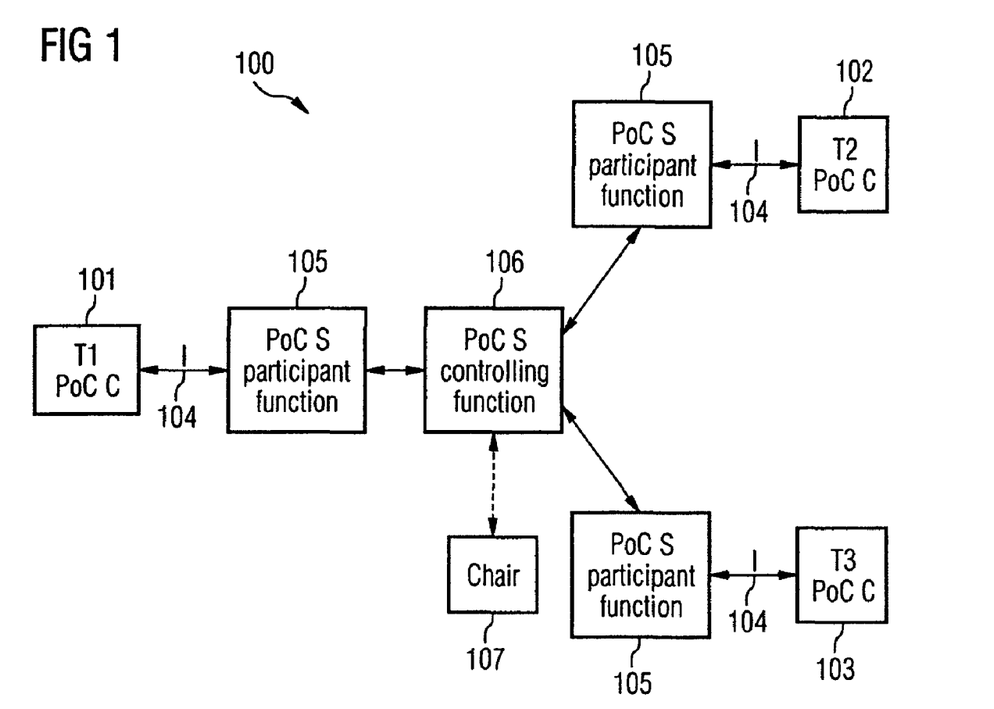
FIG. 1 shows a communication system according to an exemplary embodiment of the invention.

FIG. 1 shows a communication system 100 according to an exemplary embodiment of the invention.

A first PoC client unit 101, a second PoC client unit 102 and a third PoC client unit 103 are coupled to, in each case, one PoC server participant function 105 by means in each case of one interface 104. The PoC server participant functions 105 are coupled to a PoC server controlling function 106.

The PoC server controlling function 106 is optionally coupled to a chair 107. The chair 107 can be implemented by means of a PoC client unit 101, 102, 103 or by means of a server of the communications system 100. To illustrate, the chair 107 is the moderator of the PoC communication.

For example, the PoC-server controlling function 106 can inquire from the chair 107, to which PoC client unit 101, 102, 103 the right to talk is to be issued or at which position the PoC-server controlling function 106 is to insert a PoC client unit 101, 102, 103 into a queue. The chair 107 itself can also conduct a queue and the PoC-server controlling function 106 can request information about the state of the queue from the chair 107.

The interfaces 104 are provided, for example by means of the RAN (Radio Access Network), the CN (Core Network) and the IMS (Internet Protocol based Multimedia Subsystem) of a UMTS (Universal Mobile Telecommunication System) communication system or GSM (Global System for Mobile Communication) communication system.

However, the interfaces 104 can also be provided, by means of a PSTN (Public Switched Telephone Network) communication network.

The PoC client units 101, 102, 103 are in each case integrated in a mobile radio communication terminal which, according to the respective interface 104 is set up, for example for communication according to the UMTS standard, the GSM standard, the GPRS (General Packet Radio Service) standard or another mobile radio communication standard.

Figure 2:
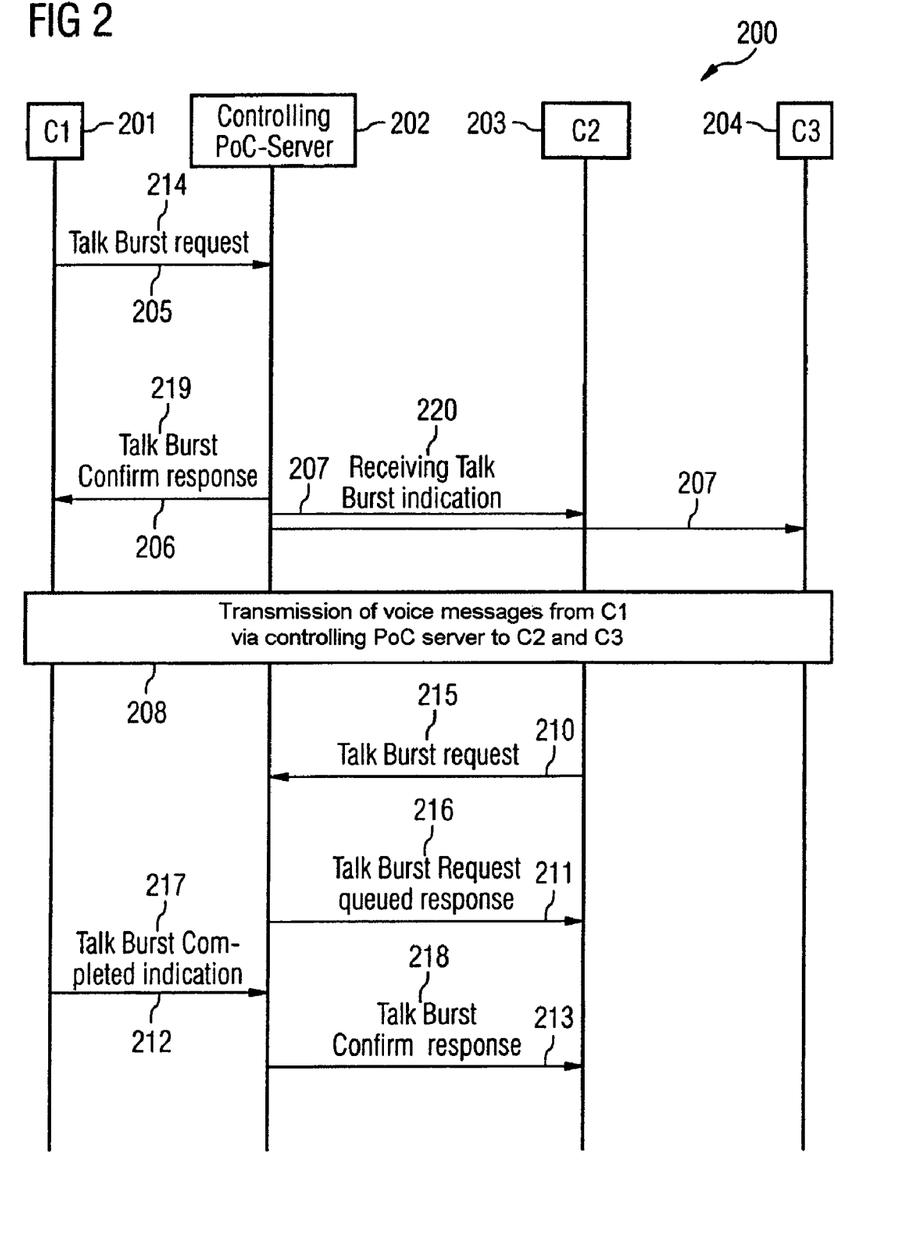
FIG. 2 shows a message flow diagram according to an exemplary embodiment of the invention.

Referring to FIG. 2, furthermore, a talk-burst control method according to an embodiment of the invention is described in which, in the PoC-server controlling function 106, a queue is maintained which contains an entry for each PoC client unit 101, 102, 103 which has requested the right to talk during the PoC communication but has not yet received it. If, for example, the right to talk is issued to the first PoC client unit 101 at a point in time, and the second PoC client unit 102 inquires for the right to talk, the PoC-server controlling function 106 (if it makes the corresponding decision) inserts the second PoC client unit 102 into the queue instead of denying the right to talk to the second PoC client unit 102. The queue is configured, for example as FIFO (first in, first out) queue or as LIFO (last in, last out) queue.

A corresponding message flow is shown in FIG. 2.

FIG. 2 shows a message flow diagram 200 in accordance with an exemplary embodiment of the invention.

The message flow shown in FIG. 2 takes place between a first PoC client unit 201, a controlling PoC server 202, a second PoC client unit 203 and a third PoC client unit 204 which are configured and arranged as explained above with respect to FIG. 1.

In step 205, the first PoC client unit 201 inquires from the controlling PoC server 202 whether it will receive the right to talk. This takes place by means of a talk-burst request message 214.

In this example, the controlling PoC server 202 decides that the first PoC client unit 201 will receive the right to talk and correspondingly sends a talk burst confirm response message 219 to the first PoC client unit 201 in step 206.

In step 207 the controlling PoC server 202 informs the second PoC client unit 203 and the third PoC client unit 204 by means of a receiving talk burst indication message 220 that the right to talk has been issued.

The talk burst request message 214, the talk burst confirm response message 219 and the receiving talk burst indication message 220 are configured as described in Push-to-Talk over Cellular (PoC) User Plane; Transport Protocols; PoC Release 1.0.

In step 208 the PoC participant using the first PoC client unit 201 can now send out voice messages by means of the controlling PoC server 202 to the second PoC client unit 203 and the third PoC client unit 204.

As mentioned above, the controlling PoC server 202 conducts a queue with all PoC client units 201, 203, 204 which have requested the right to talk but have not yet received the right to talk.

In step 205 it was assumed that the queue was empty and accordingly the first PoC client unit 201 received the right to talk as response to the right to talk request by means of the talk burst request message 214.

In step 210 the second PoC client unit 203 requests the right to talk from the controlling PoC server 202 by means of a further talk burst request message 215. It is assumed, however, that the first PoC client unit 201 has not yet finished the transmission of voice messages.

For this reason, the controlling PoC server 202 generates an entry for the second PoC client unit 203 in the queue maintained by it and informs the second PoC client unit 203 in step 211 by means of a talk burst request queued response message 216 that it has been inserted into the queue.

In step 212, the first PoC client unit 201 informs the controlling PoC server 202 by means of a talk burst completed indication message 217 that it has finished the transmission of voice data and gives up the right to talk.

Since there is an entry for the second PoC client unit 203 in the queue maintained by the controlling PoC server 202, and it is assumed in this example that there is no entry before the entry for the second PoC client unit 203 in the queue, the controlling PoC server 202 now issues the right to talk to the second PoC client unit 203. Correspondingly, the controlling PoC server 202 conveys a further talk burst confirm response message 218 to the second PoC client unit 203.

The further talk burst request message 215 and the further talk burst confirm response message 218 and the talk burst completed indication message 217 are designed as described in Push-to-Talk over Cellular (PoC) User Plane; Transport Protocols; PoC Release 1.0.

In this exemplary embodiment, the talk burst request queued response message 216 is designed according to Table 2.

TABLE 2

Talk burst request queued response

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V = 2|P| subtype |  PT = APP = 204 |           length = 3        |
+-+-+-+-+-+-+-+-+-+-+-+-+-+-+-+-+-+-+-+-+-+-+-+-+-+-+-+-+-+-+-+-+
|                       SSRC of PoC server                        |
+-+-+-+-+-+-+-+-+-+-+-+-+-+-+-+-+-+-+-+-+-+-+-+-+-+-+-+-+-+-+-+-+
|                           name = PoCl                           |
+-+-+-+-+-+-+-+-+-+-+-+-+-+-+-+-+-+-+-+-+-+-+-+-+-+-+-+-+-+-+-+-+
| queue position |              padding                           |
+-+-+-+-+-+-+-+-+-+-+-+-+-+-+-+-+-+-+-+-+-+-+-+-+-+-+-+-+-+-+-+-+
```

Table 2 and the further tables 3 to 22 in each case illustrate an RTCP APP packet which is used for implementing a message used as part of the talk burst control. Each of the RTCP APP packets represented by Tables 2 to 22 contains a field with the designated subtype, which contains a value which is specific to the respective message and is not yet otherwise occupied. For example, the value contained in the field subtype could be 01000 for the message designed according to Table 2, 01001 for the message designed according to Table 3, 01010 for the message designed according to Table 4, etc. The value contained in the field subtype is used for discriminating between the messages, that is to say for the unambiguous identification of the messages.

The RTCP APP packets shown in Tables 2 to 22 also contain a field with the character string PT=APP=204. This character string specifies that these RTCP packets are RTCP APP packets.

Each of the RTCP APP packets shown also has a field with the length specification (size specification) of the respective RTCP APP packet, e.g. length=3 (in a suitable unit which corresponds to the size of one line in the tables).

Furthermore, each of the RTCP APP packets shown has an identification of the sender of the respective RTCP APP packet. This is either an identification of the controlling PoC server 106, characterized by the entry SSRC of PoC server, an identification of the chair 107, characterized by the entry SSRC of chair, or an identification of a PoC client unit 101, 102, 103, characterized by the entry SSRC or of UE, depending on which element of the communication system 100 is sending the corresponding message.

Furthermore, each of the RTCP APP packets shown also has a field with the character string name=PoC1. This character string specifies that the RTCP APP packets are used in PoC version 1. This value can be different depending on the standardization organization.

Some of the RTCP APP packets shown also have in one line a field with the designation padding. This indicates that the corresponding line is filled up by means of so-called padding bits.

The RTCP APP packet shown in Table 2, which as mentioned is used for implementing the talk burst request queued response message 216, has a field with the designation queue position which contains the position of the (in this example) second PoC client unit 203. In this example the field queue position has a size of 8 bits, but it is also possible to use 16 bits or more if this is required.

Further messages, not transmitted in the message flow shown in FIG. 2, can be used within a talk burst control with a queue administered by the controlling PoC server 106.

A talk burst queue position request message designed, for example, according to Table 3, can be used by a PoC client unit 101, 102, 103 for inquiring from the controlling PoC server 106 whether the PoC client unit 101, 102, 103 is carried in the queue, that is to say whether an entry for the PoC client unit 101, 102, 103 exists in the queue and, if so, at which position the corresponding unit is located in the queue.

TABLE 3

Talk burst queue position request

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P| subtype |  PT = APP = 204  |         length = 2        |
+-+-+-+-+-+-+-+-+-+-+-+-+-+-+-+-+-+-+-+-+-+-+-+-+-+-+-+-+-+-+-+-+
|                         SSRC of UE                             |
+-+-+-+-+-+-+-+-+-+-+-+-+-+-+-+-+-+-+-+-+-+-+-+-+-+-+-+-+-+-+-+-+
|                         name = PoC1                            |
+-+-+-+-+-+-+-+-+-+-+-+-+-+-+-+-+-+-+-+-+-+-+-+-+-+-+-+-+-+-+-+-+
```

Such an inquiry can be answered by the controlling PoC server 106 by means of a talk burst queue position response message which is designed, for example according to Table 4. Similar to the talk burst request queued response message, the talk burst queue position response message contains a field with the designation queue position, by means of which the controlling PoC server 106 informs a PoC client unit 101, 102, 103 about the position of the entry corresponding to the PoC client unit 101, 102, 103 in the queue.

Since, apart from the entry of the field subtype, which, as mentioned, unambiguously specifies the messages, the talk burst queue position response message is identical with the talk burst queue position request message, the two messages can be selected to be completely identical in one embodiment, that is to say has the same entry in the field subtype and, to illustrate, are thus the same message.

TABLE 4

Talk burst queue position response

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P| subtype |  PT = APP = 204  |         length = 3        |
+-+-+-+-+-+-+-+-+-+-+-+-+-+-+-+-+-+-+-+-+-+-+-+-+-+-+-+-+-+-+-+-+
|                      SSRC of PoC server                        |
+-+-+-+-+-+-+-+-+-+-+-+-+-+-+-+-+-+-+-+-+-+-+-+-+-+-+-+-+-+-+-+-+
|                         name = PoC1                            |
+-+-+-+-+-+-+-+-+-+-+-+-+-+-+-+-+-+-+-+-+-+-+-+-+-+-+-+-+-+-+-+-+
| queue position |              padding                          |
+-+-+-+-+-+-+-+-+-+-+-+-+-+-+-+-+-+-+-+-+-+-+-+-+-+-+-+-+-+-+-+-+
```

A PoC client unit 101, 102, 103 can use a talk burst queue identity request message designed, for example in accordance with Table 5, to request from the controlling PoC server 106 that it conveys the (total) state of the queue to the PoC client unit 101, 102, 103.

TABLE 5

Talk burst queue identity request

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P| subtype |  PT = APP = 204  |         length = 2        |
+-+-+-+-+-+-+-+-+-+-+-+-+-+-+-+-+-+-+-+-+-+-+-+-+-+-+-+-+-+-+-+-+
|                         SSRC of UE                             |
+-+-+-+-+-+-+-+-+-+-+-+-+-+-+-+-+-+-+-+-+-+-+-+-+-+-+-+-+-+-+-+-+
|                         name = PoC1                            |
+-+-+-+-+-+-+-+-+-+-+-+-+-+-+-+-+-+-+-+-+-+-+-+-+-+-+-+-+-+-+-+-+
```

Such a request can be answered by the controlling PoC server 106 by means of a talk burst queue identity response message which is designed, for example according to Table 6, that is to say the PoC client unit 101, 102, 103 is informed about the entire current queue.

TABLE 6

Talk burst queue identity response

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P| subtype |  PT = APP = 204  |           length          |
+-+-+-+-+-+-+-+-+-+-+-+-+-+-+-+-+-+-+-+-+-+-+-+-+-+-+-+-+-+-+-+-+
|                      SSRC of PoC server                        |
+-+-+-+-+-+-+-+-+-+-+-+-+-+-+-+-+-+-+-+-+-+-+-+-+-+-+-+-+-+-+-+-+
|                         name = PoC1                            |
+-+-+-+-+-+-+-+-+-+-+-+-+-+-+-+-+-+-+-+-+-+-+-+-+-+-+-+-+-+-+-+-+
|         SDES item CNAME followed by SDES item NAME             |
:              of PoC-Client in 1st queue position               :
|                                                                |
+-+-+-+-+-+-+-+-+-+-+-+-+-+-+-+-+-+-+-+-+-+-+-+-+-+-+-+-+-+-+-+-+
|         SDES item CNAME followed by SDES item NAME             |
:              of PoC-Client in 2nd queue position               :
|                                                                |
+-+-+-+-+-+-+-+-+-+-+-+-+-+-+-+-+-+-+-+-+-+-+-+-+-+-+-+-+-+-+-+-+
:                                                                :
+-+-+-+-+-+-+-+-+-+-+-+-+-+-+-+-+-+-+-+-+-+-+-+-+-+-+-+-+-+-+-+-+
|         SDES item CNAME followed by SDES item NAME             |
:              of PoC-Client in last queue position              :
|                                                                |
+-+-+-+-+-+-+-+-+-+-+-+-+-+-+-+-+-+-+-+-+-+-+-+-+-+-+-+-+-+-+-+-+
```

In the RTCP APP packet according to Table 6, all PoC client units 101, 102, 103 for which there is an entry in the queue are listed one after the other in accordance with the order of entries in the queue in the fields following the field with the entry name=PoCl (the queue position being specified in the description of the corresponding field). The designations of the PoC client units CNAME and NAME are contained in each field as SDES items (Source Description Items, specified in RFC3550 "RTP: A Transport Protocol for Real-Time Applications", Network Working Group, July 2003) in the RTCP APP packet, as is also the case in other messages described in the text which follows.

In another embodiment, the PoC client units are specified in the queue by means of the identification SSRC (Synchronization Source, specified in RFC3550 "RTP: A Transport Protocol for Real-Time Applications", Network Working Group, July 2003) of the respective mobile radio subscriber unit so that the talk burst queue identity response message is shorter and is thus designed according to Table 7.

TABLE 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P| subtype | PT = APP = 204 |           length            |
+-+-+-+-+-+-+-+-+-+-+-+-+-+-+-+-+-+-+-+-+-+-+-+-+-+-+-+-+-+-+-+-+
|                        SSRC of PoC server                      |
+-+-+-+-+-+-+-+-+-+-+-+-+-+-+-+-+-+-+-+-+-+-+-+-+-+-+-+-+-+-+-+-+
|                            name = PoCl                         |
+-+-+-+-+-+-+-+-+-+-+-+-+-+-+-+-+-+-+-+-+-+-+-+-+-+-+-+-+-+-+-+-+
|                    SSRC of UE in 1st queue position            |
+-+-+-+-+-+-+-+-+-+-+-+-+-+-+-+-+-+-+-+-+-+-+-+-+-+-+-+-+-+-+-+-+
|                    SSRC of UE in 2nd queue position            |
+-+-+-+-+-+-+-+-+-+-+-+-+-+-+-+-+-+-+-+-+-+-+-+-+-+-+-+-+-+-+-+-+
:                                                                :
+-+-+-+-+-+-+-+-+-+-+-+-+-+-+-+-+-+-+-+-+-+-+-+-+-+-+-+-+-+-+-+-+
|                   SSRC of UE in last queue position            |
+-+-+-+-+-+-+-+-+-+-+-+-+-+-+-+-+-+-+-+-+-+-+-+-+-+-+-+-+-+-+-+-+
```

In the RTCP APP packets explained in the text which follows, too, it is always possible to replace a field

```
+-+-+-+-+-+-+-+-+-+-+-+-+-+-+-+-+-+-+-+-+-+-+-+-+-+-+-+-+-+-+-+-+
|       SDES item CNAME followed by SDES item NAME               |
:                            of ...                              :
|  ..............................................................|
+-+-+-+-+-+-+-+-+-+-+-+-+-+-+-+-+-+-+-+-+-+-+-+-+-+-+-+-+-+-+-+-+
``` by a corresponding field

```
+-+-+-+-+-+-+-+-+-+-+-+-+-+-+-+-+-+-+-+-+-+-+-+-+-+-+-+-+-+-+-+-+
|                            SSRC of ...                         |
+-+-+-+-+-+-+-+-+-+-+-+-+-+-+-+-+-+-+-+-+-+-+-+-+-+-+-+-+-+-+-+-+
``` as is the case above in the case of the talk burst queue identity response message according to Tables 6 and 7.

Furthermore, a PoC client unit 101, 102, 103 can inform the controlling PoC 106 by means of a talk burst request cancellation message designed, for example according to Table 8, that the request by means of a talk burst request message of the PoC client unit 101, 102, 103, which may already have been answered by the controlling PoC server 106 with a talk burst request queued response message, is cancelled, that is to say the PoC client unit 101, 102, 103 no longer wishes to request the right to talk.

TABLE 8

Talk burst request cancellation

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P| subtype | PT = APP = 204 |           length = 2        |
+-+-+-+-+-+-+-+-+-+-+-+-+-+-+-+-+-+-+-+-+-+-+-+-+-+-+-+-+-+-+-+-+
|                           SSRC of UEC                          |
+-+-+-+-+-+-+-+-+-+-+-+-+-+-+-+-+-+-+-+-+-+-+-+-+-+-+-+-+-+-+-+-+
|                           name = PoCl                          |
+-+-+-+-+-+-+-+-+-+-+-+-+-+-+-+-+-+-+-+-+-+-+-+-+-+-+-+-+-+-+-+-+
```

Furthermore, an embodiment is explained in which the chair 107 decides which PoC client unit 101, 102, 103 receives the right to talk.

To illustrate, the controlling PoC server 106 forwards the talk burst control signaling messages received by him to the chair 107 which, in turn, informs the controlling PoC server 106 about its decision which PoC client unit 101, 102, 103 receives the right to talk and in what order the PoC client units 101, 102, 103 receive the right to talk. The controlling PoC server 106 thereupon sends corresponding signaling messages to the PoC client units 101, 102, 103 involved.

Next, an embodiment is explained in which no queue is maintained.

Figure 3:
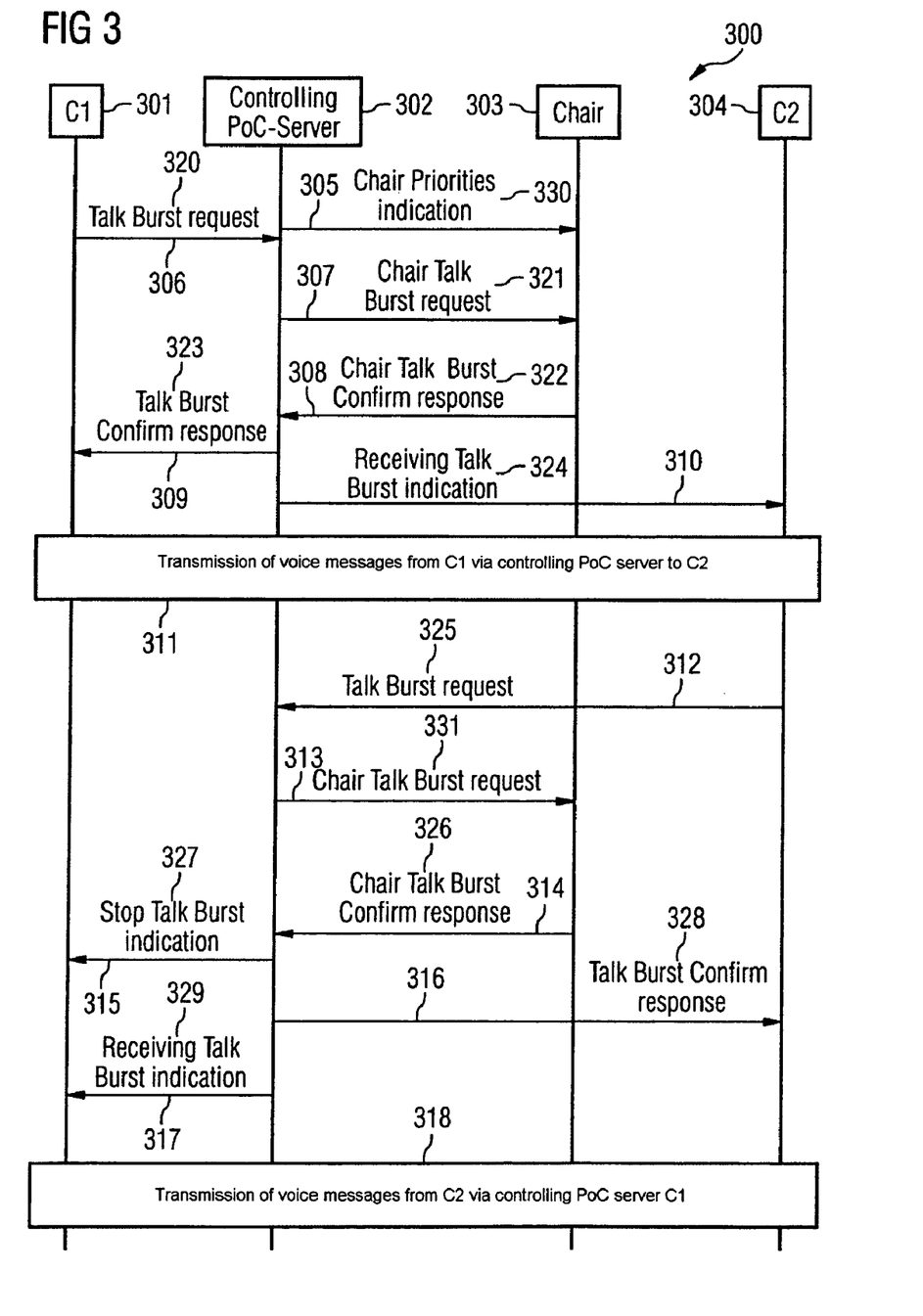
FIG. 3 shows a message flow diagram according to an exemplary embodiment of the invention.

FIG. 3 shows a message flow diagram 300 according to an exemplary embodiment of the invention.

The message flow shown in FIG. 3 takes place between a first PoC client unit 301, a controlling PoC server 302, a chair 303 and a second PoC client unit 304 which are arranged and configured as explained above with reference to FIG. 1.

Analogously to FIG. 2, the first PoC client unit 301 sends in step 306 a talk burst request message 320 to the controlling PoC server 302 by means of which it requests the right to talk. In step 307, the controlling PoC server 302 forwards this request by means of a chair talk burst request message 321 which is designed, for example according to Table 9, to the chair 303.

TABLE 9

Chair talk burst request

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P| subtype | PT = APP = 204 |           length            |
+-+-+-+-+-+-+-+-+-+-+-+-+-+-+-+-+-+-+-+-+-+-+-+-+-+-+-+-+-+-+-+-+
|                        SSRC of PoC server                      |
+-+-+-+-+-+-+-+-+-+-+-+-+-+-+-+-+-+-+-+-+-+-+-+-+-+-+-+-+-+-+-+-+
|                            name = PoCl                         |
+-+-+-+-+-+-+-+-+-+-+-+-+-+-+-+-+-+-+-+-+-+-+-+-+-+-+-+-+-+-+-+-+
|       SDES item CNAME followed by SDES item NAME               |
:                  of requesting PoC client                      :
|                                                                |
+-+-+-+-+-+-+-+-+-+-+-+-+-+-+-+-+-+-+-+-+-+-+-+-+-+-+-+-+-+-+-+-+
|                  priority of requesting PoC client             |
+-+-+-+-+-+-+-+-+-+-+-+-+-+-+-+-+-+-+-+-+-+-+-+-+-+-+-+-+-+-+-+-+
```

Since in this case the sender of the chair talk burst request message 321 is the controlling PoC server 302, the chair talk burst request message 321 contains in this case the SSRC of the controlling PoC server 302 as sender identification. For this reason, the chair talk burst request message 321 additionally contains a field with the identification of the first PoC client unit 301.

The chair talk burst request message 321 also contains the priority of the first PoC client unit 301. However, this is optional, for example the chair talk burst request message 321 could contain the priority of the first PoC client unit 301 only when it requests the right to talk for the first time during the PoC communication. As an alternative, the priority of the first PoC client unit 301 can be contained in the chair talk burst request message 321 only when the priority has changed compared with the last transmission of the priority to the chair 303.

A further alternative, which is preferably used when the priorities of the PoC client units 101, 102, 103 do not change during a PoC communication, is to transmit a chair priority indication message 330, which is designed, for example, according to Table 10 (from the controlling PoC server 302) to the chair 303 at the beginning of the PoC communication in step 305.

TABLE 10

Chair priorities indication

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V = 2|P| subtype |  PT = APP = 204  |            length          |
+-+-+-+-+-+-+-+-+-+-+-+-+-+-+-+-+-+-+-+-+-+-+-+-+-+-+-+-+-+-+-+-+
|                       SSRC of PoC server                        |
+-+-+-+-+-+-+-+-+-+-+-+-+-+-+-+-+-+-+-+-+-+-+-+-+-+-+-+-+-+-+-+-+
|                           name = PoC1                           |
+-+-+-+-+-+-+-+-+-+-+-+-+-+-+-+-+-+-+-+-+-+-+-+-+-+-+-+-+-+-+-+-+
|        SDES item CNAME followed by SDES item NAME               |
:                        of PoC client 1                          :
|                                                                 |
+-+-+-+-+-+-+-+-+-+-+-+-+-+-+-+-+-+-+-+-+-+-+-+-+-+-+-+-+-+-+-+-+
|        SDES item CNAME followed by SDES item NAME               |
:                        of PoC client n                          :
|                                                                 |
+-+-+-+-+-+-+-+-+-+-+-+-+-+-+-+-+-+-+-+-+-+-+-+-+-+-+-+-+-+-+-+-+
|                       priority of PoC client n                  |
+-+-+-+-+-+-+-+-+-+-+-+-+-+-+-+-+-+-+-+-+-+-+-+-+-+-+-+-+-+-+-+-+
```

As shown in Table 10, the chair priorities indication message 330 contains for each PoC client unit 301, 304 a field with an identification of the PoC client unit 301, 304 and the priority of the respective PoC client unit 301, 304.

In one embodiment, a chair priorities indication message 330 is transmitted again if the priority of a PoC client unit 301, 304 has changed.

In the case, not shown in FIG. 3, where a PoC client unit 301, 304 has the right to talk and signals the giving-up of the right to talk to the controlling PoC server 302 by transmitting a talk burst completed indication message, the controlling server 302 sends a chair talk burst completed indication message, which is designed, for example according to Table 11, to the chair 303.

TABLE 11

Chair talk burst completed indication

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V = 2|P| subtype |  PT = APP = 204  |            length          |
+-+-+-+-+-+-+-+-+-+-+-+-+-+-+-+-+-+-+-+-+-+-+-+-+-+-+-+-+-+-+-+-+
|                       SSRC of PoC server                        |
+-+-+-+-+-+-+-+-+-+-+-+-+-+-+-+-+-+-+-+-+-+-+-+-+-+-+-+-+-+-+-+-+
|                           name = PoC1                           |
+-+-+-+-+-+-+-+-+-+-+-+-+-+-+-+-+-+-+-+-+-+-+-+-+-+-+-+-+-+-+-+-+
|        SDES item CNAME followed by SDES item NAME               |
:                     of indicating PoC client                    :
|                                                                 |
+-+-+-+-+-+-+-+-+-+-+-+-+-+-+-+-+-+-+-+-+-+-+-+-+-+-+-+-+-+-+-+-+
```

In the step 308, the chair 303 informs the controlling PoC server 302 of the result of its decision whether the first PoC client unit 301 will receive the right to talk. This decision can be made by taking into consideration the priority of the first PoC client unit 301.

In this example, it is assumed that the chair 303 decides that the first PoC client unit 301 receives the right to talk. Accordingly, the chair 303 transmits a chair talk burst confirm response message 322, to the controlling PoC server 302 in step 308. In this example, the chair talk burst confirm response message 322 is designed according to Table 12 and contains an identification of the PoC client unit 301, 304 to which the right to talk is to be issued, in this example the first PoC client unit 301.

TABLE 12

Chair talk burst confirm response

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V = 2|P| subtype |  PT = APP = 204  |            length          |
+-+-+-+-+-+-+-+-+-+-+-+-+-+-+-+-+-+-+-+-+-+-+-+-+-+-+-+-+-+-+-+-+
|                          SSRC of chair                          |
+-+-+-+-+-+-+-+-+-+-+-+-+-+-+-+-+-+-+-+-+-+-+-+-+-+-+-+-+-+-+-+-+
|                           name = PoC1                           |
+-+-+-+-+-+-+-+-+-+-+-+-+-+-+-+-+-+-+-+-+-+-+-+-+-+-+-+-+-+-+-+-+
|        SDES item CNAME followed by SDES item NAME               |
:                       of granted PoC client                     :
|                                                                 |
+-+-+-+-+-+-+-+-+-+-+-+-+-+-+-+-+-+-+-+-+-+-+-+-+-+-+-+-+-+-+-+-+
```

Should the chair 303 decide that the right to talk is not granted to the first PoC client unit 301, the chair 303 transmits in step 308 a chair talk burst reject response message to the controlling PoC server 302 which is designed, for example according to Table 13, contains an identification of the PoC client unit 301, 304 to which the right to talk is denied, a specification of a reason for the denial (reason code, see also Push-to-Talk over Cellular (PoC) User Plane; Transport Protocols; PoC Release 1.0), the length of a specification of a reason (length) and the specification of a reason (reason phrase).

TABLE 13

Chair talk burst reject response

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P| subtype |  PT = APP = 204  |           length          |
+-+-+-+-+-+-+-+-+-+-+-+-+-+-+-+-+-+-+-+-+-+-+-+-+-+-+-+-+-+-+-+-+
|                        SSRC of chair                           |
+-+-+-+-+-+-+-+-+-+-+-+-+-+-+-+-+-+-+-+-+-+-+-+-+-+-+-+-+-+-+-+-+
|                         name = PoC1                            |
+-+-+-+-+-+-+-+-+-+-+-+-+-+-+-+-+-+-+-+-+-+-+-+-+-+-+-+-+-+-+-+-+
|          SDES item CNAME followed by SDES item NAME            |
:                      of rejected PoC client                    :
|                                                                |
+-+-+-+-+-+-+-+-+-+-+-+-+-+-+-+-+-+-+-+-+-+-+-+-+-+-+-+-+-+-+-+-+
| Reason code  |    Length    |          Reason phase            |
+-+-+-+-+-+-+-+-+-+-+-+-+-+-+-+                                  :
:                                                                :
+-+-+-+-+-+-+-+-+-+-+-+-+-+-+-+-+-+-+-+-+-+-+-+-+-+-+-+-+-+-+-+-+
```

TABLE 14

Chair stop talk burst indication

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P| subtype |  PT = APP = 204  |           length          |
+-+-+-+-+-+-+-+-+-+-+-+-+-+-+-+-+-+-+-+-+-+-+-+-+-+-+-+-+-+-+-+-+
|                        SSRC of chair                           |
+-+-+-+-+-+-+-+-+-+-+-+-+-+-+-+-+-+-+-+-+-+-+-+-+-+-+-+-+-+-+-+-+
|                         name = PoC1                            |
+-+-+-+-+-+-+-+-+-+-+-+-+-+-+-+-+-+-+-+-+-+-+-+-+-+-+-+-+-+-+-+-+
|          SDES item CNAME followed by SDES item NAME            |
:                      of granted PoC client                     :
|                                                                |
+-+-+-+-+-+-+-+-+-+-+-+-+-+-+-+-+-+-+-+-+-+-+-+-+-+-+-+-+-+-+-+-+
|        reason code         |        additional information     |
+-+-+-+-+-+-+-+-+-+-+-+-+-+-+-+-+-+-+-+-+-+-+-+-+-+-+-+-+-+-+-+-+
```

Since it is assumed in this example that the right to talk is granted to the first PoC client unit 301, the controlling PoC server 302 correspondingly sends a talk burst confirm response message 323 to the first PoC client unit 301 in step 309, analogously to FIG. 2.

Analogously to step 207 in FIG. 2, the controlling PoC server 302 conveys a receiving talk burst indication message 324 to the second PoC client unit 304.

Analogously to step 208 in FIG. 2, the first PoC client unit 301 begins with the transmission of voice messages to the second PoC client unit 304 in step 311.

It is then assumed that the second PoC client unit requests the right to talk during the PoC communication by means of a further talk burst request message 325 in step 312.

Analogously to step 307, the controlling PoC server 302 transmits a further chair talk burst request message 331 to the chair 303.

In this example it is assumed that the priority of the second PoC client unit 304 is higher than that of the first PoC client unit 301. The chair 303 accordingly decides that the right to talk is now to be granted to the second PoC client unit 304, and informs the controlling PoC server 302 of this by means of a further chair talk burst confirm response message 326.

In step 315, the controlling PoC server informs the first PoC client unit 301 by means of a stop talk burst indication message 327 (see Table 1) that the first PoC client unit 301 must give up the right to talk and must correspondingly end the transmission of voice messages.

In the case where the chair 303 itself withdraws the right to talk from a PoC client unit 301, 304 which has the right to talk, it signals this to the PoC client unit 301, 304 by means of a chair stop talk burst indication message which is designed, for example, according to Table 14.

The chair stop talk burst indication message shown in Table 14 contains the identification of the PoC client unit which happens to have the right to talk at the moment and from which the right to talk is withdrawn, and the specification of a reason why the PoC client unit must end the transmission of voice messages (reason code), and a field for additional information.

Analogously to step 309, the controlling PoC server 302 conveys a further talk burst confirm response message 328 to the second PoC client unit 304 in step 316.

Analogously to step 310, the controlling PoC server 302 conveys a further receiving talk burst indication message 329 to the first PoC client unit 301 in step 317.

Analogously to step 311, the second PoC client unit 304 begins to transmit voice messages to the first PoC client unit 301.

In the further text, an embodiment is explained in which the decision which PoC client unit 101, 102, 103 will receive the right to talk is made by the chair 107, a queue analogous to the queue in the embodiment described with reference to FIG. 2 being administered by the controlling server 106.

Figure 4:
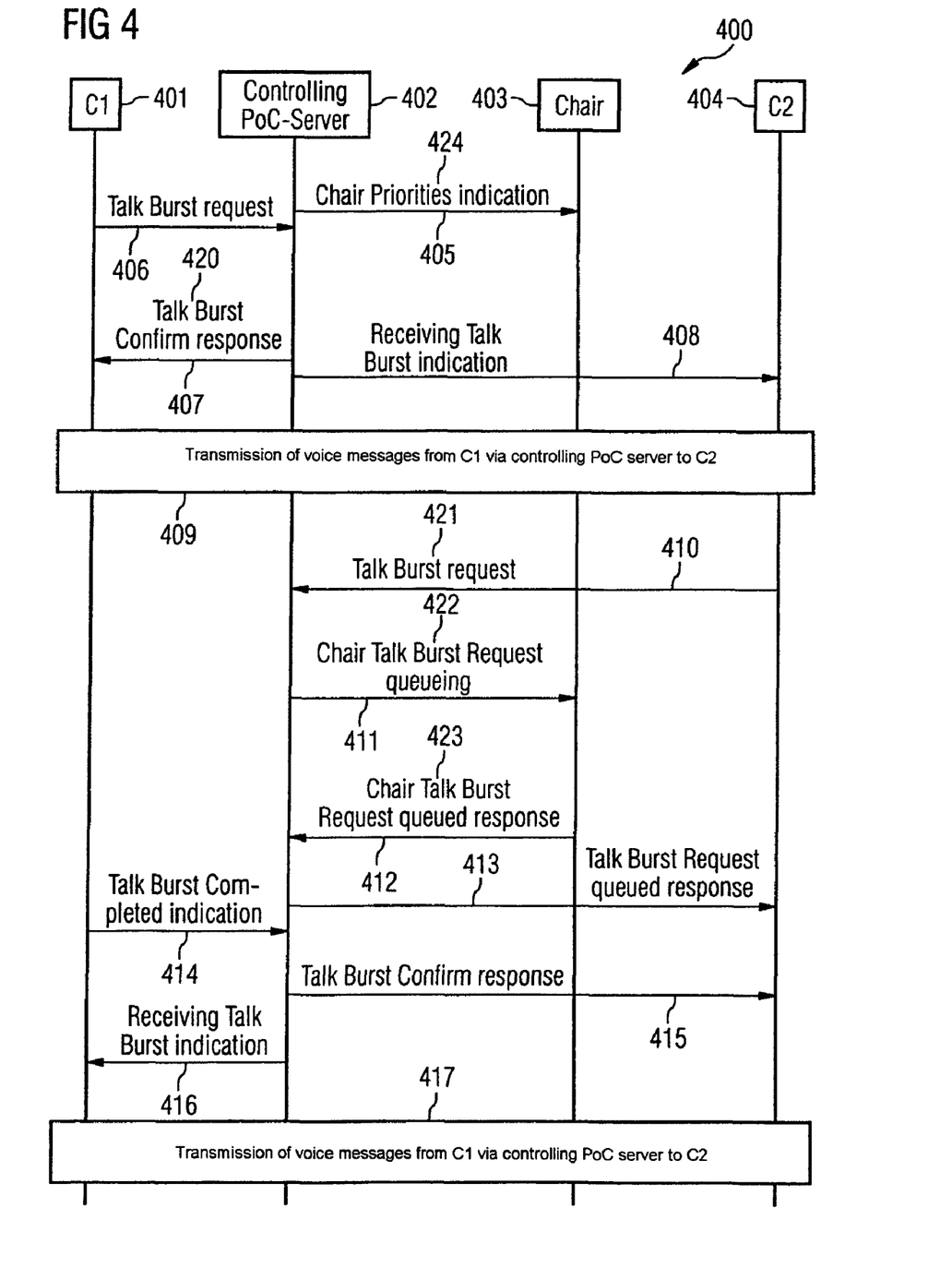
FIG. 4 shows a message flow diagram according to an exemplary embodiment of the invention.

FIG. 4 shows a message flow diagram 400 according to an exemplary embodiment of the invention.

The message flow shown takes place between a first PoC client unit 401, a controlling PoC server 402, a chair 403 and a second PoC client unit 404 which are arranged and configured as described with reference to FIG. 1.

Steps 405 and 406 are performed analogously to steps 305 and 306 in FIG. 3.

Since it is assumed in this example that the queue administered by the controlling PoC server 402 is empty, the controlling PoC server 402 will not inquire from the chair 403 but grants the right to talk to the first PoC client unit 401, analogously to step 309 in FIG. 3, by means of a talk burst confirm response message 420 in step 407.

Steps 408 and 409 are performed in accordance with steps 310 and 311.

It is assumed that, in step 410, the second PoC client unit 404 sends a request for the right to talk to the PoC-server participant function 402 by means of a talk burst request message 421 in step 410.

Since in this case, the right to talk is currently issued to the first PoC client unit 401, the controlling PoC server 402 inquires from the chair 403 by means of a chair talk request queuing message 422, which is designed for example according to Table 15, in step 411 at which position the second PoC client unit 404 is to be inserted into the queue administered by the controlling PoC server 402.

TABLE 15

Chair talk burst request queuing

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V = 2|P| subtype |  PT = APP = 204 |           length          |
+-+-+-+-+-+-+-+-+-+-+-+-+-+-+-+-+-+-+-+-+-+-+-+-+-+-+-+-+-+-+-+-+
|                         SSRC of PoC server                     |
+-+-+-+-+-+-+-+-+-+-+-+-+-+-+-+-+-+-+-+-+-+-+-+-+-+-+-+-+-+-+-+-+
|                            name = PoCl                         |
+-+-+-+-+-+-+-+-+-+-+-+-+-+-+-+-+-+-+-+-+-+-+-+-+-+-+-+-+-+-+-+-+
|             SDES item CNAME followed by SDES item NAME         |
:                      of requesting PoC client                  :
|                                                                |
+-+-+-+-+-+-+-+-+-+-+-+-+-+-+-+-+-+-+-+-+-+-+-+-+-+-+-+-+-+-+-+-+
|                   priority of requesting PoC client            |
+-+-+-+-+-+-+-+-+-+-+-+-+-+-+-+-+-+-+-+-+-+-+-+-+-+-+-+-+-+-+-+-+
|             SDES item CNAME followed by SDES item NAME         |
:                 of PoC client in 1st queue position            :
|                                                                |
+-+-+-+-+-+-+-+-+-+-+-+-+-+-+-+-+-+-+-+-+-+-+-+-+-+-+-+-+-+-+-+-+
|              priority of PoC client in 1st queue position      |
+-+-+-+-+-+-+-+-+-+-+-+-+-+-+-+-+-+-+-+-+-+-+-+-+-+-+-+-+-+-+-+-+
|             SDES item CNAME followed by SDES item NAME         |
:                 of PoC client in 2nd queue position            :
|                                                                |
+-+-+-+-+-+-+-+-+-+-+-+-+-+-+-+-+-+-+-+-+-+-+-+-+-+-+-+-+-+-+-+-+
|              priority of PoC client in 2nd queue position      |
+-+-+-+-+-+-+-+-+-+-+-+-+-+-+-+-+-+-+-+-+-+-+-+-+-+-+-+-+-+-+-+-+
|             SDES item CNAME followed by SDES item NAME         |
:                 of PoC client in last queue position           :
|                                                                |
+-+-+-+-+-+-+-+-+-+-+-+-+-+-+-+-+-+-+-+-+-+-+-+-+-+-+-+-+-+-+-+-+
|             priority of PoC client in last queue position      |
+-+-+-+-+-+-+-+-+-+-+-+-+-+-+-+-+-+-+-+-+-+-+-+-+-+-+-+-+-+-+-+-+
```

As shown, the chair talk burst request queuing message 422 contains for each PoC client unit 401, 404 carried in the queue an identification of the PoC client unit 401, 404 and the priority of the respective PoC client unit 401, 404 in the order determined by the queue and an identification and the priority of the second PoC client unit 404.

In one embodiment, the second PoC client unit 404 can withdraw the right to talk from the first PoC client unit 401 (instead of only being inserted into the first position of the queue, for example), when the first PoC client unit 401 has the right to talk and has a lower priority than the second PoC client unit 404. In this embodiment, the chair talk burst request queuing message 422 can be designed, for example according to Table 15a and contain the identification of the PoC client unit 401, 404, which currently has the right to talk, and the priority of this PoC client unit 401, 404. The chair 404 can correspondingly allow by means of a chair talk burst confirm response message that the right to talk is withdrawn from the first PoC client unit 401 and allocated to the second PoC client unit 404, or refuse to do this by means of a chair talk burst reject response message.

In another embodiment, the PoC client unit 401, 404 which currently has the right to talk, is always carried in the first position of the queue. Accordingly, a further PoC client unit 401, 404 with a higher priority could withdraw the right to talk from the PoC client unit 401, 404 which currently has the right to talk, by being inserted into the first position of the queue and correspondingly the PoC client unit 401, 404, which currently has the right to talk, falling back to the second position in the queue.

TABLE 15a

Chair talk burst request queuing (alternative)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V = 2|P| subtype |  PT = APP = 204 |           length          |
+-+-+-+-+-+-+-+-+-+-+-+-+-+-+-+-+-+-+-+-+-+-+-+-+-+-+-+-+-+-+-+-+
|                         SSRC of PoC server                     |
+-+-+-+-+-+-+-+-+-+-+-+-+-+-+-+-+-+-+-+-+-+-+-+-+-+-+-+-+-+-+-+-+
|                            name = PoCl                         |
+-+-+-+-+-+-+-+-+-+-+-+-+-+-+-+-+-+-+-+-+-+-+-+-+-+-+-+-+-+-+-+-+
|             SDES item CNAME followed by SDES item NAME         |
:                      of requesting PoC client                  :
|                                                                |
+-+-+-+-+-+-+-+-+-+-+-+-+-+-+-+-+-+-+-+-+-+-+-+-+-+-+-+-+-+-+-+-+
|                   priority of requesting PoC client            |
+-+-+-+-+-+-+-+-+-+-+-+-+-+-+-+-+-+-+-+-+-+-+-+-+-+-+-+-+-+-+-+-+
|             SDES item CNAME followed by SDES item NAME         |
:                 of PoC client with right to speak              :
|                                                                |
+-+-+-+-+-+-+-+-+-+-+-+-+-+-+-+-+-+-+-+-+-+-+-+-+-+-+-+-+-+-+-+-+
|              priority of PoC client with right to speak        |
+-+-+-+-+-+-+-+-+-+-+-+-+-+-+-+-+-+-+-+-+-+-+-+-+-+-+-+-+-+-+-+-+
|             SDES item CNAME followed by SDES item NAME         |
:                 of PoC client in 1st queue position            :
|                                                                |
+-+-+-+-+-+-+-+-+-+-+-+-+-+-+-+-+-+-+-+-+-+-+-+-+-+-+-+-+-+-+-+-+
|              priority of PoC client in 1st queue position      |
+-+-+-+-+-+-+-+-+-+-+-+-+-+-+-+-+-+-+-+-+-+-+-+-+-+-+-+-+-+-+-+-+
|             SDES item CNAME followed by SDES item NAME         |
:                 of PoC client in 2nd queue position            :
|                                                                |
+-+-+-+-+-+-+-+-+-+-+-+-+-+-+-+-+-+-+-+-+-+-+-+-+-+-+-+-+-+-+-+-+
|              priority of PoC client in 2nd queue position      |
+-+-+-+-+-+-+-+-+-+-+-+-+-+-+-+-+-+-+-+-+-+-+-+-+-+-+-+-+-+-+-+-+
:                                                                :
+-+-+-+-+-+-+-+-+-+-+-+-+-+-+-+-+-+-+-+-+-+-+-+-+-+-+-+-+-+-+-+-+
|             SDES item CNAME followed by SDES item NAME         |
:                 of PoC client in last queue position           :
|                                                                |
+-+-+-+-+-+-+-+-+-+-+-+-+-+-+-+-+-+-+-+-+-+-+-+-+-+-+-+-+-+-+-+-+
|             priority of PoC client in last queue position      |
+-+-+-+-+-+-+-+-+-+-+-+-+-+-+-+-+-+-+-+-+-+-+-+-+-+-+-+-+-+-+-+-+
```

Analogously to the above, the transmission of priorities by means of the chair talk burst request queuing message 422 can be omitted if the priorities of the PoC client units 401, 404 have been transmitted by means of a chair priorities indication message 424 in step 405.

In step 412, the chair 403 conveys to the controlling PoC server 402 the position of the second PoC client unit 404 by means of a chair talk burst request queued response message 423, which is designed according to Table 16.

TABLE 16

Chair talk burst request queued response

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V = 2|P| subtype |  PT = APP = 204  |           length          |
+-+-+-+-+-+-+-+-+-+-+-+-+-+-+-+-+-+-+-+-+-+-+-+-+-+-+-+-+-+-+-+-+
|                         SSRC of Chair                          |
+-+-+-+-+-+-+-+-+-+-+-+-+-+-+-+-+-+-+-+-+-+-+-+-+-+-+-+-+-+-+-+-+
|                           name = PoCl                          |
+-+-+-+-+-+-+-+-+-+-+-+-+-+-+-+-+-+-+-+-+-+-+-+-+-+-+-+-+-+-+-+-+
|            SDES item CNAME followed by SDES item NAME          |
:                     of requesting PoC client                   :
|                                                                |
+-+-+-+-+-+-+-+-+-+-+-+-+-+-+-+-+-+-+-+-+-+-+-+-+-+-+-+-+-+-+-+-+
| queue position |                  padding                      |
+-+-+-+-+-+-+-+-+-+-+-+-+-+-+-+-+-+-+-+-+-+-+-+-+-+-+-+-+-+-+-+-+
```

As an alternative, the chair 403 can also convey the information about the complete updated queue that is to say the queue in which the second PoC client unit 404 has been accommodated, to the controlling server 402 in step 412.

This is done by means of a chair talk burst request queue result message, which is designed, for example according to Table 17 and contains the information of the (now updated) queue analogously to the chair talk burst request queuing message 422.

TABLE 17

Chair talk burst request queue result

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V = 2|P| subtype |  PT = APP = 204  |           length          |
+-+-+-+-+-+-+-+-+-+-+-+-+-+-+-+-+-+-+-+-+-+-+-+-+-+-+-+-+-+-+-+-+
|                         SSRC of Chair                          |
+-+-+-+-+-+-+-+-+-+-+-+-+-+-+-+-+-+-+-+-+-+-+-+-+-+-+-+-+-+-+-+-+
|                           name = PoCl                          |
+-+-+-+-+-+-+-+-+-+-+-+-+-+-+-+-+-+-+-+-+-+-+-+-+-+-+-+-+-+-+-+-+
|            SDES item CNAME followed by SDES item NAME          |
:                of PoC client in 1st queue position             :
|                                                                |
+-+-+-+-+-+-+-+-+-+-+-+-+-+-+-+-+-+-+-+-+-+-+-+-+-+-+-+-+-+-+-+-+
|            SDES item CNAME followed by SDES item NAME          |
:                of PoC client in 2nd queue position             :
|                                                                |
+-+-+-+-+-+-+-+-+-+-+-+-+-+-+-+-+-+-+-+-+-+-+-+-+-+-+-+-+-+-+-+-+
:                                                                :
+-+-+-+-+-+-+-+-+-+-+-+-+-+-+-+-+-+-+-+-+-+-+-+-+-+-+-+-+-+-+-+-+
|            SDES item CNAME followed by SDES item NAME          |
:                of PoC client in last queue position            :
|                                                                |
+-+-+-+-+-+-+-+-+-+-+-+-+-+-+-+-+-+-+-+-+-+-+-+-+-+-+-+-+-+-+-+-+
```

The position of the second PoC client unit 404 in the queue is determined by the chair 403, taking into consideration the priority of the second PoC client unit 404.

The steps 413, 414, 415 then following are performed analogously to steps 211, 212 and 213 in FIG. 2.

Steps 416 and 417 are performed analogously to steps 408 and 409.

In another embodiment, the chair 107 administers a queue. In this case, the chair 107 is contacted by the controlling PoC server 106 with each request of the PoC client units 101, 102, 103.

In this case, a transmission of a chair talk burst reject response message or a chair talk burst request queued response message as described above is also possible in addition to the transmission of a chair talk burst confirm response message 322 in step 308 of the message flow diagram 300 shown in FIG. 3. If one of the PoC client units 101, 120, 103 inquires from the controlling PoC server 106 for the position of the entry corresponding to the position of the PoC client unit 101, 102, 103 in the waiting list, for example by means of a talk burst queue position request message described above, the controlling PoC server 106 contacts the chair 107 by means of a chair talk burst queue position request message which is designed, for example, according to Table 18.

TABLE 18

Chair talk burst queue position request

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V = 2|P| subtype |  PT = APP = 204  |         length = 3        |
+-+-+-+-+-+-+-+-+-+-+-+-+-+-+-+-+-+-+-+-+-+-+-+-+-+-+-+-+-+-+-+-+
|                       SSRC of PoC server                       |
+-+-+-+-+-+-+-+-+-+-+-+-+-+-+-+-+-+-+-+-+-+-+-+-+-+-+-+-+-+-+-+-+
|                           name = PoCl                          |
+-+-+-+-+-+-+-+-+-+-+-+-+-+-+-+-+-+-+-+-+-+-+-+-+-+-+-+-+-+-+-+-+
|            SDES item CNAME followed by SDES item NAME          |
:                     of requesting PoC client                   :
|                                                                |
+-+-+-+-+-+-+-+-+-+-+-+-+-+-+-+-+-+-+-+-+-+-+-+-+-+-+-+-+-+-+-+-+
```

The chair talk burst queue position request message contains a specification of the PoC client unit 101, 102, 103 which has made the inquiry.

The chair 107 thereupon responds to the controlling PoC server 106 by means of a chair talk burst queue position response message which is designed according to Table 19 and analogously to the talk burst queue position response message described above.

TABLE 19

Chair talk burst queue position response

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V = 2|P| subtype |  PT = APP = 204  |           length          |
+-+-+-+-+-+-+-+-+-+-+-+-+-+-+-+-+-+-+-+-+-+-+-+-+-+-+-+-+-+-+-+-+
|                         SSRC of Chair                          |
+-+-+-+-+-+-+-+-+-+-+-+-+-+-+-+-+-+-+-+-+-+-+-+-+-+-+-+-+-+-+-+-+
|                           name = PoCl                          |
+-+-+-+-+-+-+-+-+-+-+-+-+-+-+-+-+-+-+-+-+-+-+-+-+-+-+-+-+-+-+-+-+
|            SDES item CNAME followed by SDES item NAME          |
:                     of requesting PoC client                   :
|                                                                |
+-+-+-+-+-+-+-+-+-+-+-+-+-+-+-+-+-+-+-+-+-+-+-+-+-+-+-+-+-+-+-+-+
| queue position |                  padding                      |
+-+-+-+-+-+-+-+-+-+-+-+-+-+-+-+-+-+-+-+-+-+-+-+-+-+-+-+-+-+-+-+-+
```

Analogously to the case described above, the chair talk burst queue position response message is identical to the talk burst request queued response message 216 apart from the subtype field and the specification of the sender's address.

If a PoC client unit 101, 102, 103 makes an inquiry about the overall state of the queue, for example by means of a talk burst queue identity request message, the controlling PoC server 106 contacts the chair 107 by means of a chair talk burst queue identity request message, which is designed according to Table 20, and by means of which the inquiry is forwarded to the chair 107.

TABLE 20

Chair talk burst queue identity request

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V = 2|P| subtype |  PT = APP = 204  |         length = 2        |
+-+-+-+-+-+-+-+-+-+-+-+-+-+-+-+-+-+-+-+-+-+-+-+-+-+-+-+-+-+-+-+-+
|                        SSRC of PoC server                       |
+-+-+-+-+-+-+-+-+-+-+-+-+-+-+-+-+-+-+-+-+-+-+-+-+-+-+-+-+-+-+-+-+
|                            name = PoCl                          |
+-+-+-+-+-+-+-+-+-+-+-+-+-+-+-+-+-+-+-+-+-+-+-+-+-+-+-+-+-+-+-+-+
```

The chair 107 responds to this inquiry by means of a chair talk burst queue identity response message which is designed, for example according to Table 21 and is identical to the talk burst queue identity response message apart from the subtype field and the field containing the specification of the sender of the message.

TABLE 21

Chair talk burst queue identity response

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V = 2|P| subtype |  PT = APP = 204  |           length          |
+-+-+-+-+-+-+-+-+-+-+-+-+-+-+-+-+-+-+-+-+-+-+-+-+-+-+-+-+-+-+-+-+
|                          SSRC of Chair                          |
+-+-+-+-+-+-+-+-+-+-+-+-+-+-+-+-+-+-+-+-+-+-+-+-+-+-+-+-+-+-+-+-+
|                            name = PoCl                          |
+-+-+-+-+-+-+-+-+-+-+-+-+-+-+-+-+-+-+-+-+-+-+-+-+-+-+-+-+-+-+-+-+
|         SDES item CNAME followed by SDES item NAME              |
:              of PoC-Client in 1st queue position                :
|                                                                 |
+-+-+-+-+-+-+-+-+-+-+-+-+-+-+-+-+-+-+-+-+-+-+-+-+-+-+-+-+-+-+-+-+
|         SDES item CNAME followed by SDES item NAME              |
:              of PoC-Client in 2nd queue position                :
|                                                                 |
+-+-+-+-+-+-+-+-+-+-+-+-+-+-+-+-+-+-+-+-+-+-+-+-+-+-+-+-+-+-+-+-+
|         SDES item CNAME followed by SDES item NAME              |
:              of PoC-Client in last queue position               :
|                                                                 |
+-+-+-+-+-+-+-+-+-+-+-+-+-+-+-+-+-+-+-+-+-+-+-+-+-+-+-+-+-+-+-+-+
```

If a PoC client unit 101, 102, 103 reports, for example by means of a talk burst request cancellation message as explained above, that it no longer requests the right to talk, that is to say an entry corresponding to the PoC client unit 101, 102, 103 should be removed from the queue, the controlling PoC server 106 forwards this information to the chair 107 by means of a chair talk burst request cancellation message, which is designed, for example, according to Table 22 and is designed analogously to the talk burst request cancellation message.

TABLE 22

Chair talk burst request cancellation

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V = 2|P| subtype |  PT = APP = 204  |           length          |
+-+-+-+-+-+-+-+-+-+-+-+-+-+-+-+-+-+-+-+-+-+-+-+-+-+-+-+-+-+-+-+-+
|                        SSRC of PoC server                       |
+-+-+-+-+-+-+-+-+-+-+-+-+-+-+-+-+-+-+-+-+-+-+-+-+-+-+-+-+-+-+-+-+
|                            name = PoCl                          |
+-+-+-+-+-+-+-+-+-+-+-+-+-+-+-+-+-+-+-+-+-+-+-+-+-+-+-+-+-+-+-+-+
|         SDES item CNAME followed by SDES item NAME              |
:                  of requesting PoC client                       :
|                                                                 |
+-+-+-+-+-+-+-+-+-+-+-+-+-+-+-+-+-+-+-+-+-+-+-+-+-+-+-+-+-+-+-+-+
```

What is claimed is:

1. A method for requesting at least one of a push-to-talk right to talk during a push-to-talk communication and queuing information about a queue, the method comprising:
generating a real-time control protocol message, by a push-to-talk client unit, said protocol message containing at least one of queue administration information for administering the queue which has entries which each corresponds to a request for the push-to-talk right to talk during the push-to-talk communication and which queue is taken into consideration during allocation of the push-to-talk right to talk, and information that the push-to-talk client unit is requesting queuing information; and
transmitting the real-time control protocol message, by the push-to-talk client unit, to a controlling push-to-talk server.

2. The method as claimed in claim 1, wherein the queue administration information specifies at least one of a priority of the push-to-talk client unit and that the push-to-talk client unit takes back a request of the push-to-talk client unit for the push-to-talk right to talk.

3. The method as claimed in claim 1, wherein the queue is administered by at least one of the controlling push-to-talk server and a decision unit.

4. The method as claimed in claim 1, wherein the requested queuing information is information about the position of the entry which corresponds to at least one of a request for a push-to-talk right to talk by the push-to-talk client unit and information of the complete queue.

5. The method as claimed in claim 1, further comprising at least one step of allocating the push-to-talk right to talk, by the controlling push to talk server, by taking into consideration the queue and generating the real-time control protocol response message with the requested queuing information, by the controlling push to talk server, and conveying it to the push-to-talk client unit.

6. A method for allocating a push-to-talk right to talk during a push-to-talk communication and for reporting queuing information about a queue, the method comprising:
generating a real-time control protocol message, by a controlling push-to-talk server, said protocol message containing at least one of queue administration information for administering the queue which has entries which each corresponds to a request for the push-to-talk right to talk during the push-to-talk communication and which queue is taken into consideration during allocation of the push-to-talk right to talk, information that the controlling push-to-talk server is requesting queuing information, and information that the controlling push-to-talk server is requesting control information which specifies how the push-to-talk right to talk is to be allocated; and transmitting the real-time control protocol message, by the controlling push-to-talk server, to a decision unit.

7. The method as claimed in claim 6, wherein the queue administration information contains an identification of a push-to-talk client unit and specifies at least one of a priority of the push-to-talk client unit and that the push-to-talk client unit takes back a request of the push-to-talk client unit for the push-to-talk right to talk.

8. The method as claimed in claim 6, wherein the queue is administered by the decision unit.

9. The method as claimed in claim 6, wherein the requested queuing information is at least one of information about the position of the entry which corresponds to a push-to-talk right to talk request of a push-to-talk client unit and information about the overall state of the queue.

10. The method as claimed in claim 6, further comprising at least one step of generating a first real-time control protocol response message with the requested control information, by the decision unit, and conveying the first real-time control protocol response message to the controlling push-to-talk server; generating a second real-time control protocol response message with the requested queuing information, by the decision unit, and conveying the second real-time control protocol response message to the controlling push-to-talk server; and administering the queue, by the decision unit, taking into consideration the queue administration information.

11. A push-to-talk client unit of a push-to-talk communication system, comprising:

a message generation unit configured to generate a real-time control protocol message which contains at least one of queue administration information for administering a queue which has entries which each corresponds to a request for a push-to-talk right to talk during the push-to-talk communication and which queue is taken into consideration during allocation of the push-to-talk right to talk, and information that the push-to-talk client unit is requesting queuing information; and a transmitting device configured to transmit the real-time control protocol message to a controlling push-to-talk server.

12. A controlling push-to-talk server of a push-to-talk communication system, comprising:

a message generation unit configured to:

generate at least one of a first real-time control protocol message which contains at least one of queue administration information for administering a queue which has entries which each corresponds to a request for a push-to-talk right to talk during a push-to-talk communication and which queue is taken into consideration during allocation of the push-to-talk right to talk, information that the controlling push-to-talk server is requesting queuing information, and information that the controlling push-to-talk server is requesting control information which specifies how the push-to-talk right to talk is to be allocated; and a second real-time control protocol message which contains queuing information requested by a push-to-talk client unit; and a transmitting device configured to transmit at least one of the first real-time control protocol message to a decision unit and the second real-time control protocol message to the push-to-talk client unit.

13. A decision unit of a push-to-talk communication system, comprising:

a message generation unit configured to generate a real-time control protocol message which contains at least one of a queuing information, requested by a controlling push-to-talk server, about a queue which has entries which each corresponds to a request for a push-to-talk right to talk during the push-to-talk communication and which queue is taken into consideration during allocation of the push-to-talk right to talk, and control information, requested by a controlling push-to-talk server, which specifies how the push-to-talk right to talk is to be allocated; and a transmitting device configured to transmit the real-time control protocol message to the controlling push-to-talk server.

14. A push-to-talk client unit of a push-to-talk communication system, comprising:

a message generation means for generating a real-time control protocol message which contains at least one of queue administration information for administering a queue which has entries which each corresponds to a request for a push-to-talk right to talk during the push-to-talk communication and which queue is taken into consideration during allocation of the push-to-talk right to talk, and information that the push-to-talk client unit is requesting queuing information; and a transmitting means for transmitting the real-time control protocol message to a controlling push-to-talk server.

\* \* \* \* \*